United States Patent [19]
Hekal

[11] Patent Number: 6,130,263
[45] Date of Patent: *Oct. 10, 2000

[54] DESICCANT ENTRAINED POLYMER

[75] Inventor: Ihab M. Hekal, Fultonville, N.Y.

[73] Assignee: Capitol Specialty Plastics, Inc., Auburn, Ala.

[*] Notice: This patent is subject to a terminal disclaimer.

[21] Appl. No.: 08/812,315

[22] Filed: Mar. 5, 1997

Related U.S. Application Data

[63] Continuation-in-part of application No. 08/611,298, Mar. 5, 1996, Pat. No. 5,911,937, which is a continuation-in-part of application No. 08/424,996, Apr. 19, 1995.

[51] Int. Cl.[7] .............................. F26B 25/16; B65B 81/26
[52] U.S. Cl. .......................... 521/50; 521/905; 524/387; 524/503; 524/550; 264/165; 264/173.16; 264/176.1; 264/250; 264/255; 264/259; 264/268; 264/DIG. 78; 34/95; 34/329; 53/400; 53/428; 53/111; 206/204; 252/194; 502/402; 502/405
[58] Field of Search ................................ 206/204; 34/95, 34/329; 502/402, 405; 53/400, 428, 111; 264/DIG. 78, 250, 259, 510, 173.16, 268, 165, 299, 176.1, 255; 252/194

[56] References Cited

U.S. PATENT DOCUMENTS

| | | |
|---|---|---|
| 1,481,971 | 1/1924 | Whiting . |
| 1,532,831 | 4/1925 | Mastin . |
| 2,202,742 | 5/1940 | McCorkhill . |
| 2,511,666 | 6/1950 | Barr . |
| 2,638,179 | 5/1953 | Yard . |
| 2,991,500 | 7/1961 | Hagen . |
| 3,013,308 | 12/1961 | Armour . |

(List continued on next page.)

FOREIGN PATENT DOCUMENTS

| | | |
|---|---|---|
| 0172714 A1 | 2/1986 | European Pat. Off. . |
| 0225 593 A3 | 6/1987 | European Pat. Off. . |
| 931087639 | 9/1993 | European Pat. Off. . |
| 0 599 690 A1 | 6/1994 | European Pat. Off. . |
| 2 698 289 | 5/1994 | France . |
| 40 13 799 A1 | 10/1991 | Germany . |
| 4013799 | 10/1991 | Germany . |
| 56-89928 | 9/1981 | Japan . |
| 62-108019 | 5/1987 | Japan . |
| 62-294441 | 12/1987 | Japan . |
| 1-281143 | 11/1989 | Japan . |
| WO 96/29603 | 9/1996 | WIPO . |
| WO 96/33108 | 10/1996 | WIPO . |
| 97/03610 | 5/1997 | WIPO . |
| WO 97/27483 | 7/1997 | WIPO . |
| WO 97/32663 | 9/1997 | WIPO . |
| WO 98/39231 | 9/1998 | WIPO . |

OTHER PUBLICATIONS

Leaversuch, D., "Desiccant molding technique builds moisture resistance", *Modern Plastics*, May, 1997, pp. 35–36.

*Primary Examiner*—Catherine Timm
*Assistant Examiner*—Suzanne E. Mason
*Attorney, Agent, or Firm*—Dreier & Baritz, LLP.

[57] ABSTRACT

The present invention includes processes and resulting structures for producing moisture absorbing desiccant entrained polymers. A polymer is caused to assume a molten state, typically by applying heat and melting the polymer. To achieve certain results in the hardened end product, such as rigidity and durability, the polymer normally acts as a moisture barrier in a solidified state, both before and after melting. A desiccating agent is blended into the polymer so that the desiccating agent is distributed within the polymer. A channeling agent is also blended into the polymer so that it is distributed within the polymer. The blending of the components is preferably done before the polymer is caused to assume a molten state. Together, the polymer, desiccating agent and channeling agent create a blended mixture. The mixture is solidified so that the channeling agent forms passages in the mixture through which moisture is communicable to desiccating agent that is entrained within the mixture. The solidified mixture may be used to form plug type inserts and liners for closed containers, or it may be used for producing laminated sheeting employed as package wrap.

32 Claims, 3 Drawing Sheets

U.S. PATENT DOCUMENTS

| | | |
|---|---|---|
| 3,101,242 | 8/1963 | Jackson . |
| 3,156,402 | 11/1964 | Dupuis . |
| 3,245,946 | 4/1966 | O'Connar et al. . |
| 3,256,411 | 6/1966 | Grasty . |
| 3,256,441 | 6/1966 | Grasty . |
| 3,322,355 | 5/1967 | Bryant . |
| 3,326,810 | 6/1967 | Dolan et al. . |
| 3,537,676 | 11/1970 | Miller . |
| 3,567,085 | 3/1971 | Flores . |
| 3,687,062 | 8/1972 | Frank . |
| 3,704,806 | 12/1972 | Plachenov et al. . |
| 3,730,372 | 5/1973 | Komendowski . |
| 3,730,375 | 5/1973 | Komendowski . |
| 3,750,966 | 8/1973 | Anderson . |
| 3,804,282 | 4/1974 | Komendowski . |
| 3,833,406 | 9/1974 | White . |
| 3,926,379 | 12/1975 | Dryden et al. . |
| 3,929,295 | 12/1975 | Montalbano . |
| 4,013,566 | 3/1977 | Taylor . |
| 4,021,388 | 5/1977 | Griffin . |
| 4,029,830 | 6/1977 | Yamammoto . |
| 4,036,360 | 7/1977 | Deffeyes . |
| 4,081,397 | 3/1978 | Booe . |
| 4,153,206 | 5/1979 | Haefner et al. . |
| 4,165,743 | 8/1979 | Denning . |
| 4,176,755 | 12/1979 | Winchell . |
| 4,201,209 | 5/1980 | LeVeen et al. . |
| 4,205,794 | 6/1980 | Horton et al. . |
| 4,240,937 | 12/1980 | Allen . |
| 4,243,767 | 1/1981 | Kaufman et al. . |
| 4,284,548 | 8/1981 | Kaufman et al. . |
| 4,340,352 | 7/1982 | Hayberg . |
| 4,351,630 | 9/1982 | Hayberg et al. . |
| 4,387,803 | 6/1983 | Mercil . |
| 4,394,144 | 7/1983 | Aoki . |
| 4,407,897 | 10/1983 | Farrell et al. . |
| 4,425,410 | 1/1984 | Farrell et al. . |
| 4,447,565 | 5/1984 | Lula et al. . |
| 4,464,443 | 8/1984 | Farrell et al. . |
| 4,485,204 | 11/1984 | Nabors . |
| 4,527,350 | 7/1985 | Tockey, Jr. . |
| 4,531,437 | 7/1985 | Szablak et al. . |
| 4,533,576 | 8/1985 | Tanahashi et al. . |
| 4,547,536 | 10/1985 | Nabors . |
| 4,554,297 | 11/1985 | Dabi . |
| 4,573,258 | 3/1986 | Io et al. . |
| 4,619,409 | 10/1986 | Harpet et al. . |
| 4,646,914 | 3/1987 | Gipson . |
| 4,665,050 | 5/1987 | Degen et al. . |
| 4,686,093 | 8/1987 | Flanigen et al. . |
| 4,725,393 | 2/1988 | Nasu . |
| 4,745,073 | 5/1988 | Forrest et al. . |
| 4,759,508 | 7/1988 | Griffith et al. . |
| 4,770,944 | 9/1988 | Farrell et al. . |
| 4,772,300 | 9/1988 | Cullen et al. . |
| 4,783,056 | 11/1988 | Abrams . |
| 4,783,206 | 11/1988 | Cullen et al. . |
| 4,792,484 | 12/1988 | Moritani . |
| 4,809,915 | 3/1989 | Koffsky et al. . |
| 4,834,234 | 5/1989 | Sacherer et al. . |
| 4,884,756 | 12/1989 | Pearson . |
| 4,969,998 | 11/1990 | Henn . |
| 4,971,261 | 11/1990 | Solomons . |
| 4,994,312 | 2/1991 | Maier et al. . |
| 5,030,406 | 7/1991 | Sorensen . |
| 5,078,909 | 1/1992 | Shigeta et al. . |
| 5,096,130 | 3/1992 | Gulmini . |
| 5,114,003 | 5/1992 | Jackish et al. . |
| 5,118,655 | 6/1992 | Pedersen . |
| 5,128,182 | 7/1992 | Bunker et al. . |
| 5,130,018 | 7/1992 | Tolman et al. . |
| 5,143,763 | 9/1992 | Yamada et al. . |
| 5,154,960 | 10/1992 | Mucci et al. . |
| 5,178,336 | 1/1993 | Lodovico et al. . |
| 5,186,331 | 2/1993 | Valster . |
| 5,203,806 | 4/1993 | Broida . |
| 5,221,000 | 6/1993 | Lee . |
| 5,242,652 | 9/1993 | Savigny . |
| 5,267,646 | 12/1993 | Inoue et al. . |
| 5,286,407 | 2/1994 | Inoue et al. . |
| 5,304,419 | 4/1994 | Shores . |
| 5,320,778 | 6/1994 | Miksic et al. . |
| 5,344,589 | 9/1994 | Miksic et al. . |
| 5,346,142 | 9/1994 | Miller et al. . |
| 5,373,971 | 12/1994 | Laffy et al. . |
| 5,389,347 | 2/1995 | Hall . |
| 5,393,457 | 2/1995 | Miksic et al. . |
| 5,399,609 | 3/1995 | Moss . |
| 5,415,907 | 5/1995 | Inoue et al. . |
| 5,432,214 | 7/1995 | Lancesseur . |
| 5,437,414 | 8/1995 | Hall . |
| 5,486,380 | 1/1996 | Enniss et al. . |
| 5,494,155 | 2/1996 | Evans et al. . |
| 5,496,397 | 3/1996 | Fischer et al. . |
| 5,518,761 | 5/1996 | Hatsuda et al. . |
| 5,551,141 | 9/1996 | De'Ath et al. . |
| 5,580,369 | 12/1996 | Belding et al. . |
| 5,656,503 | 8/1997 | May . |
| 5,773,105 | 6/1998 | Klett . |
| 5,814,136 | 9/1998 | Wood . |

DESICCANT ENTRAINED POLYMER

RELATED APPLICATIONS

This application is a continuation-in-part of U.S. Ser. No. 08/611,298 filed on Mar. 5, 1996 now U.S. Pat. No. 5,911, 937, which in turn is a continuation-in-part of U.S. Ser. No. 08/424,996, filed Apr. 19, 1995.

FIELD OF THE INVENTION

This invention relates generally to the use of desiccant material in packaging; more particularly, the present invention relates to packaging material having a desiccant contained therein. Still more particularly, the present invention relates to polymers having desiccating agents applied to or blended or mixed therein. The invention further relates to desiccant entrained polymers that include means by which desiccant located within interior portions of the polymer structure are exposed to moisture that is exterior to the polymer body. The desiccant entrained polymer of the present invention is particularly useful in the manufacture of containers and packaging for items requiring moisture reduced environments.

BACKGROUND OF THE INVENTION

There are many articles that are preferably stored, shipped and/or utilized in an environment that is as moisture free as possible. Therefore, containers having the ability to absorb excess moisture trapped therein have been recognized as desirable. One application in which moisture absorbing containers are desired is for the shipment and storage of medications whose efficacy is compromised by moisture. The initial placement of medicines into a sealed moisture free container is usually controllable. Furthermore, the container for the medicine is selected so that it has a low permeability to moisture. Therefore, the medication will normally be protected from moisture until it reaches the end user. Once the medicine is received by the consumer, however, the container must be repeatedly opened and closed to access the medication. Each time the container is opened and unsealed, moisture bearing air will most likely be introduced into the container and sealed therein upon closure. Unless this moisture is otherwise removed from the atmosphere or head space of the container, it may be detrimentally absorbed by the medication. For this reason, it is a well known practice to include a desiccating unit together with the medication in the container.

Other items, such as electronic components, may require reduced moisture conditions for optimal performance. These components may be sealed in containers, but excess moisture that is initially trapped therein must be removed. Furthermore, the housings may not be completely moisture tight, and moisture may be allowed to seep into the container. This moisture must also be retained away from the working components. For these reasons, it is important to include a desiccating agent within the housing for absorbing and retaining excess moisture. Because of the delicacy of many of the components that are to be protected from the moisture, it is important that the desiccant used not be of a "dusting" nature that may contaminate and compromise the performance of the components. Therefore, it has been recognized as advantageous to expose a desiccating agent to the interior space of such containers, while at the same time shielding the working components from actual contact with the desiccating material, including desiccant dust that may be produced therefrom.

In other instances, moisture may be released from items that have been placed in containers or sealed in packaging wrap for shipping and/or storage. Prime examples of such items are food stuffs—that release moisture during shipping and storage. In the instance of containers that are sealed and substantially impermeable to moisture, the released moisture will remain within the container about the product. If not removed, this released moisture may have ill effects on the very item that released the moisture. It has been found that a substantial amount of moisture is released from certain food products within the first forty-eight (48) hours after manufacture and packaging. This released moisture will remain about the product until removed. If the moisture is not removed shortly after its release, it may cause the food to degrade into a condition that is not saleable. In these cases, desiccants may be included together with the contained items to continually absorb the released moisture until the product is unpacked. In this way, a relatively dry environment is maintained about the stored item.

The need to eliminate moisture from within sealed containers has been previously recognized. Early attempts to achieve these goals included the provision of desiccant materials in fabric or similar bags that are placed in the containers, together and commingled with the matter being shipped or stored. A consumer related problem, however, exists when the desiccant is loose and commingled together with consumable items. If not carefully and thoroughly processed upon unpacking, the desiccant may not be separated from the consumables and could harm a person if unknowingly ingested.

Several inventions have been patented that include both structures and processes that provide means for absorbing moisture by way of a desiccant that is included in various forms of packaging. A most basic example is found in the disclosure of U.S. Pat. No. 3,326,810 issued Jun. 20, 1967 to Dolan et al for a DESICCANT PACKAGE. That patent includes disclosure of a non-dusting silica gel desiccant bag. The bag is created from two sheet of nylon mesh that are bonded into a bag within which the silica gel is contained. The nylon mesh has micro-porous polyurethane bonded to it and through which moisture passes while at the same time containing the desiccating silica gel within the bags interior. It is explained that the micro porous structure of the polyurethane allows the moisture to be transmitted thereacross, but is nonpermeable to desiccant dust that may be produced by the silica gel.

Another known method by which a desiccant is included in a container is to provide a special side-compartment having limited exposure to the interior of the container. Within the side-compartment, desiccating materials or drying agents are held for the purpose of absorbing moisture that is present within the primary portion of the container. Examples of such inventions are found in U.S. Pat. No. 4,834,234 issued May 30, 1989 to Sacherer et al for a CONTAINER FOR TEST STRIPS. Sacherer provides a drying agent cell or compartment within the cap portion of a container for test strips that are used in the analysis of body fluids. Those strips must be maintained in a moisture reduced environment for which Sacherer's invention is intended. It is disclosed that the drying agent cell is covered by a water vapor-permeable cardboard disc that separates that cell from the interior of the container. It is the cardboard disc that provides a barrier between the desiccant or drying agent and the container's interior space. A similar example is found in U.S. Pat. No. 5,114,003 issued May 19, 1992 to Jackisch et al for a TABLET VIAL WITH DESICCANT IN BOTTOM. Jackisch includes disclosure of a desiccant canister that is secured to the bottom inside of a container's base. The desiccant canister within which the desiccating material is contained is initially sealed to prevent the absorption of moisture. Immediately prior to use, the desiccant canister is punctured and communication of moisture across the container is allowed to the desiccant.

Oftentimes, separate capsules of desiccant that are expensive to produce are provided within the packaging. U.S. Pat. No. 4,783,206 issued Nov. 8, 1988 to Cullen et al for an ADSORBENT CARTRIDGE describes an elongated hollow cylindrical body fabricated of polyethylene, polyester or polypropylene. It is intended that the sides of the body member of the cartridge be moisture impermeable and that membrane disc coverings be provided as end caps to the cartridge's body through which moisture, odors and other gases are permeable. A desiccating agent is enclosed within the cartridge thereby maintaining the desiccant separate from other items commonly contained within the common container. By the cartridge's construction, it is intended that moisture pass only through the and caps constructed of spun-bonded polyolefin, and not the rigid, high density plastic side walls of the cartridge.

A DRYING CAPSULE is disclosed in U.S. Pat. No. 2,638,179 issued May 12, 1953 to Yard. The drying capsule of Yard includes a desiccant that is encapsulated within a moisture permeable skin. The desiccant, which is contained within the capsule, absorbs moisture from the skin, and not directly from the outside atmosphere. The gelatin capsule is used as a regulator for governing the rate at which moisture is absorbed by the desiccating agent. In some instances, the desiccating agent may be very vigorous in its action and would absorb moisture too quickly if not coated by the prescribed capsule or skin. It is also the capsule that provides a barrier between the desiccant agent and the items to be stored together therewith.

The patented inventions described above each provide a compartment within which a desiccating agent is contained and separated from a primary storage compartment of a container by a physical barrier. The compartment within which the desiccant is carried may, or may not be fixed to prevent relative movement between it and the storing container. An important and primary function of the enclosure about the desiccant is to provide a barrier between the desiccant agent and the primary storage compartment while at the same time permitting the transmission of moisture thereacross. In each instance, there is no means for preventing the formation of desiccant dust, but instead a means for keeping it separate and apart from the other products is provided. The potential for the barrier being compromised is ever present and the possibility of desiccant dust contaminating the stored items is possible.

It is also known to entrain desiccant directly into plastics and rubbers. An example of such entrainment is found in U.S. Pat. No. 3,245,946 issued Apr. 12, 1966 to O'Connor et al for RUBBER AND PLASTIC FORMULATIONS AND PROCESS. Therein, the entrainment of a desiccating agent into rubber, plastic, and resin formulations during their production is utilized to contain moisture produced during the manufacture of those materials that would otherwise adversely affect the produced material. There is no contemplation that the included desiccant will have residual capabilities that may be utilized in subsequently manufactured products beyond the material's original production.

A flexible desiccant body is disclosed in U.S. Pat. No. 4,013,566 issued Mar. 22, 1977 to Taylor. Therein, a desiccant material is homogeneously distributed and bound in a moisture transmissive aliphatic epoxy polymer matrix. Therein, it is specifically recognized that polypropylene bags are not suited as containment materials because of potential attrition problems due to melting or thermoplasticity of the bags during use. It is explained that an important aspect of the Taylor invention is that the polymer be elastomeric so that it retains flexibility and the capability to absorb vibrations and mechanical shocks. Furthermore, it should be moisture transmissive so that the desiccant material bound within the matrix may receive trapped moisture within the solid body. It is explicit from the Taylor disclosure that polypropylene, because of its characteristics as a moisture barrier, would not be used as a moisture transmissive polymer matrix of this invention and within which a desiccant agent would be entrained. Furthermore, it is expressly stated that such polymers as polyethylene would not be utilized because of their rigid nature which may result in cracking, attrition and insufficient water absorption capacity.

Another instance in which desiccant agents have been combined with polymers is found in layered plastic sheeting in which an interior oxygen impermeable layer must be protected against moisture which compromises the oxygen barrier characteristics of that interior layer. Examples of such utilization of a desiccant in a layered structure may be found in United States patents that are assigned to the American Can Company of Greenwich, Conn. and to the Kuraray Co., Ltd. of Kurashiki, Japan. Those United States patents include U.S. Pat. Nos. 4,407,897; 4,425,410; 4,464,443; 4,770,944 and 4,792,484. In the disclosure of these several patents, the laminated structure has an interior layer that serves as an oxygen barrier and is manufactured from such polymers as ethylene-vinyl alcohol (EVOH); in each instance, the EVOH is provided solely as an oxygen barrier. These EVOH layers serve as oxygen barriers as long as their moisture content remains below certain levels. In at least one application described in those patents, the layered packaging is used for food products that must be sterilized in a retorting process in which the food product, together with the packaging is steam treated. During the steam treatment process, the protective outer layers which are commonly manufactured from polypropylene and polyethylene and moisture impermeable at lower temperatures, permit the transmission of moisture thereacross at the elevated temperatures of the retorting process. The EVOH layer loses its oxygen barrier characteristics above a certain moisture level. Desiccant is therefore added to the adhesive layers adjacent to the EVOH layer to control the moisture levels within the oxygen barrier layer within the interior of the layered sheets so that the oxygen barrier layer can maintain its oxygen barrier properties. It is not contemplated, nor intended that any desiccant included within the laminate structure would have desiccating abilities outside the exterior moisture barrier layers of the laminate; those exterior layers typically being constructed from polyethylene, polypropylene, or a blend of the two. In any event, the only purpose of the described inventions of those patents is to maintain the interior EVOH layer of the laminate at relatively low moisture levels to assure its performance as an oxygen barrier.

An example of a desiccating agent being combined with a polymer binding material is found in U.S. Pat. No. 4,665,050 issued May 12, 1987 to Degen et al for SELF-SUPPORTING STRUCTURES CONTAINING IMMOBILIZED INORGANIC SORBENT PARTICLES AND METHOD FOR FORMING THE SAME. Therein, it is explained that sorbent particles are mixed into a softened, but not melted thermoplastic material such as polyethylene or polypropylene. By only softening the polymer medium, 'blinding' of the sorbent material is prevented. That is, exterior portions of the sorbent material must be exposed and not blocked by the surrounding polymer. In this manner, moisture is transmitted into the sorbent material at those locations that are not covered by the binding polymer. It is explained that the polymer should only be softened to an extent that it becomes slightly tacky and does not become so viscous as to flow.

The combination of a moisture-absorbent substance with a thermoplastic resin is disclosed in U.S. Pat. No. 5,078,909 entitled MOISTURE-ABSORBENT COMPOSITIONS AND MOLDED ITEMS that issued Jan. 7, 1992 to Shigeta et al. Therein, it is contemplated that a thermoplastic resin, which may include polyethylene, polypropylene, as well as others may be employed in the formation of the composition. The inclusion of various additives are contemplated in the Shigeta disclosure which may include color indicators that respond to the moisture content of the composition, as well as foaming agents that may be mixed together with the other substances to produce a composition that is light in weight and has high moisture absorption properties both in its outer and inner parts.

Prior to the present invention, the establishment of channels throughout a desiccant entrained polymer has not been known. The present invention, has been developed in response to a recognized need for structures constructed from polymers that normally act as moisture barriers in their solid, rigid state, but when produced according to the present invention have a desiccant entrained therein which is capable of absorbing moisture exterior to the polymer.

SUMMARY OF THE INVENTION

The desiccant structures and methods of the present invention makes it possible to provide a polymer matrix within which a desiccant agent is entrained in the structure of the product itself or in an appropriate insert therefor. In each instance, a means is provided by which moisture is communicable to most, if not all of the entrained desiccant, including that which is located most internally within the matrix. As has been described above with respect to previously patented inventions, it is known to entrain a desiccant within a polymer base for the purpose of fixing the desiccant with respect to the polymer and then using the combination in the manufacture of other items. The sole purpose of the earlier combinations was to reduce, if not eliminate, desiccant dust that may precipitate from desiccant particles confined in other ways. Many types of packaging and containers are manufactured from plastics and are selected based on the properties and performance characteristics of the plastic in each application. In some instances, flexibility is important when the packaging is utilized as plastic wrap for articles or in the construction of pouch or bag-type containers. In these cases, plastic sheeting is often utilized that may be folded or otherwise positioned about an object and then sealed to prevent foreign matter from contaminating the enclosed items. In some instances, the housed item may be moisture sensitive and for that reason it is desirable to have packaging with desiccating abilities that will absorb moisture trapped within the interior of the package and retain it within its structure away from the item so that the item is protected and preserved.

In other applications, containers may be desirably constructed from a rigid material that maintains its form and resists breakage and deformation of the container. Like the plastic wrap, items may be stored within the rigid containers that also require minimized moisture conditions. For that reason, it is desirable to similarly entrain or combine desiccating agents within these plastics which harden and form a rigid structure or container. Many of the plastic or polymer matrixes within which the desiccant agent will be entrained is substantially moisture impermeable so that desiccant entrained within the interior of the plastic, and not exposed at the surface of the plastic body, will be unable to absorb and retain moisture. One solution has been to locate the desiccant at the polymer's surface. This, however, has not proved to be entirely satisfactory in that greater amounts of desiccant may be required to remove sufficient amounts of moisture to protect the items that are to be packaged. For that reason, the present invention has been developed, as a result of desiring to entrain desiccating agent throughout a greater portion of a rigid plastic body or container, while at the same time providing means by which moisture may be communicated to most, if not all of the desiccant that has been entrained therein. To do so will permit a plastic structure to be more greatly loaded with desiccant thereby enhancing absorption capacities.

As previously stated, a primary drawback of entraining a desiccant within a rigid polymer matrix is the creation of a moisture impermeable polymer encasement about the individual desiccant particles contained within the structure. The present invention discloses both a structure and a method by which passages are established throughout the polymer matrix that communicate the entrained desiccant particles to the appropriate areas of the exterior of the plastic body in a manner that permits moisture to migrate from outside the plastic structure to interior locations where the desiccant particles are positioned. Furthermore, these channels or veins through which the moisture is permitted to travel may be occupied by agents or compounds that absorb and transport moisture at rates even greater than those achieved by the desiccant. These transporting agents, however, are unable to absorb significant quantities of moisture and retain those quantities therein. For that reason, the transporting agents are used to act as bridges from the surface of the plastic bodies inwardly to the desiccant particles positioned within the plastic structure.

It has been discovered that certain compounds, which are referred to herein as channeling agents, may be combined with a polymer base matrix that is used in the formation of rigid bodies, including at least portions of closeable containers. In practice, the polymer base material into which the desiccant agent and channeling agent are blended and mixed include as examples, polyethylene and polypropylene, each of which are particularly suited for use in the construction of rigid containers. Most often, these containers will be injection or blow molded from molten polymer.

The desiccant and channeling agent may be added to the polymer when the polymer base is in a molten state prior to forming it into a container, or preferably even before the polymer is in the molten state, so that these additive agents may be blended and thoroughly mixed throughout the base polymer material. It is preferred that the desiccant material, the channeling agent and the polymer be thoroughly mixed even before melting the polymer base to insure that all of the materials are thoroughly mixed before reaching the melt phase. For example, such a technique is particularly useful when the desiccant, channeling agent and polymer base are all powders. When the channeling agent is a high mw polyglycol, the agent can be a powder. By mixing the three powderous components together thoroughly before entering the melt phase, it will be insured that a most even distribution of desiccant and channeling agent throughout the polymer base is achieved.

After thoroughly blending the several materials together and the mixing process is subsequently stopped, the channeling agent forms veins or channels that act as moisture communicating passages throughout the polymer. A polyglycol such as polyethylene glycol, ethylene-vinyl alcohol (EVOH) and polyvinyl alcohol (PVOH) are among those materials which have been found to be particularly suited as channeling agents. The use of a polyglycol such as polyethyleneglycol is most preferred. The polymer base and channeling agents do not separate out into distinct levels or phases, one above the other, but instead establish veined domains of channeling agent that extend across the polymer base thereby establishing channels or passages through the polymer. The channels are open at the surface of the polymer structures and thereby provide access for moisture to interior portions of the polymer matrix.

Alternatively, the desiccant material may be added on top of a polymer base mixed with channeling agent during a thermal forming process of sheets of plastic material.

Various types of desiccating agent are known in the art and most may be used in mixtures with polymer bases. Similarly, most can also be used in the mixtures of the present invention that contain both polymer and channeling agents. There are three primary types of desiccating agents.

The first type comprises chemical compounds that form crystals that contain water. Examples of such desiccant are anhydrous salts which tend to absorb water or moisture and form a stable salt. In this reaction with the moisture, a stable compound is formed within which the moisture is held and prevented from release.

The second type of desiccant compounds are those which are considered to be reactive. These compounds typically undergo a chemical reaction with water or moisture and form new compounds within which the water is combined. These newly formed compounds are generally irreversible at low temperature and require a significant amount of energy to be regenerated so that they may be reused as a desiccant. These reactive type desiccants are mainly used in solvent drying and as additives to polymers which must themselves be maintained in a moisture reduced state. One application in which these reactive type compounds are particularly suitable was described above with respect to the multi-layer sheeting within which a layer of EVOH is laminated between two shielding layers of what is normally moisture impermeable material such as polypropylene or polyethylene. As earlier noted, however, these types of sheeting or wrap are used to package food products which must subsequently be sterilized in a retorting process wherein the packaged good is exposed to hot sterilizing steam. At the elevated temperatures, the exterior layers permit moisture to pass therethrough and compromise the oxygen barrier effectiveness of the EVOH interior layer. Because of the reactive desiccant that has been entrained that moisture is absorbed into the desiccant and retained therein away from the EVOH layer thereby allowing the EVOH layer to maintain its oxygen barrier characteristics.

The third type of desiccants obtain their moisture absorbing capabilities through physical absorption. The absorption process is accomplished because of a fine capillary morphology of the desiccant particles which pulls moisture therethrough. The pore size of the capillaries, as well as the capillaries' density determine the absorption properties of the desiccant. Examples of these physical absorption desiccants include molecular sieves, silica gels, clays and starches. Because these types of physical absorption desiccants are both inert and non-water soluble, they are preferred for many applications. Among other reasons, these innocuous characteristics are particularly compatible with food products and medicinal products that may be enclosed within containers formed from the desiccant entrained polymers, or at least exposed thereto. As stated previously, however, any of the three types may be employed within the polymer bases of the present invention for the purposes of producing a desiccant entrained polymer. Suitable desiccating agents include silica gel, molecular sieve and naturally occurring clay compounds which would also include montmorillimite clay. Similarly, all three types of desiccant may be compatible with most channeling agents that are employed.

In practice, the polymer based matrix, the desiccating agent, and the channeling agent will be mixed together, preferably when all three components are in powder state and before the polymer base is in a molten state. Because of the relatively fine size of the desiccant particles, it is advantageous to have many small channels or passages throughout the polymer base, as opposed to a few large channels that will expose less surface area within the polymer solid. For that reason, dimer agents, such as polypropylene maleic anhydride, or any plasticizer, may be optionally added to the mixture reducing viscosities and increasing the mixing compatibility of the base polymer and channeling agent. By increasing their compatibility, the channeling agent is better dispersed throughout the polymer and thereby forms finer, more capillary-like veins, instead of larger, more artery-like veins. In this way, the more widely dispersed and finer passages expose more of the desiccant particles bound within the polymer matrix.

It has also been found advantageous to select desiccating agents having a polarity that causes an infinity between the desiccant and the channeling agent. An example of such a polar desiccant is silica which is attracted and more compatible with the channeling agent than it is with the polypropylene or polyethylene polymer base. For this reason, during the separating process when the channels are formed throughout the polymer base, the desiccating agent will also migrate toward the channeling agent domains to which it is attracted. In this manner, the channeling agent is truly permitted to act as a bridge between moisture located exteriorly to the polymer structure and the desiccant that is located within the polymer. This is particularly true with respect to desiccant that is bound within the channeling agent filled passages. Polar plastisizers such as glycerin may be further added to the mixture which enhance the dispersion or mixing of desiccant into the channeling agent. The hydrophilic nature of the channeling agents allow them to truly act as a moisture bridge through the hydrophobic polypropylene or polyethylene polymer base because of its relatively fast rate of transmission of moisture thereacross. The desiccating agent which is primarily concentrated within the channeling agent picks up the moisture from the transmitting channeling agent and retains it therein. In this way, the moisture is quickly pulled throughout the channels or passages and made available to the desiccating particles or agents which are dispersed throughout the plastic body.

It has been found that the higher the desiccant concentration in the mixture, the greater the absorption capacity will be of the plastic structure created therefrom. However, the body will be more brittle and the mixture will be more difficult to either thermally form, extrude or injection mold. For that reason, it has been found to be advantageous to have a maximum desiccant load of approximately sixty percent by weight with respect to the polymer base. It is preferred to maintain the load within a forty-five to fifty percent range for optimal performance in certain applications such as those that require a rigid structure. Similarly, in the instance of polypropylene being used as the polymer base or phase, its content should be maintained at about forty percent by weight, or greater to assure its performance characteristics.

Because the desiccant entrained polymer is more brittle than polymer without the desiccant, it has been found advantageous to mold containers so that an interior portion of the container is desiccant entrained while the exterior portions are formed from more pure polymer. In this form, the containers will not only be more durable and less brittle, but it will also act as a moisture barrier that resists the transmission of moisture from the exterior into the interior of the container. In this manner, the moisture absorption capacity of the desiccant agent is potentiated by exposing it exclusively to the interior of the container from which it is desired that moisture be withdrawn and retained therefrom.

As has been previously discussed, the desiccant entrained polymer of the present invention has many applications. A preferred use, however, is the construction of rigid containers that are suitable for containing relatively small volumes of product such as food stuffs and medicines. In many cases, these types of products must be shipped and stored in reduced moisture environments. Therefore, it has been found to be particularly advantageous to mold container bodies from polymers such as polypropylene and polyethylene to exploit their moisture barrier characteristics. Desiccant entrained polymer inserts may be constructed according to the present invention for inclusion within the interior of the container. One form of insert is a plug of any suitable shape formed from desiccant entrained polymer. While the plug would serve its purpose by being merely deposited within the moisture barrier container, it may also be fixed to an interior location so that it does move about within the interior space. In one particular embodiment, it is anticipated that a plug formed into a disc may be shaped and sized to be pressed fit into the bottom of a polymer formed container.

In a manner similar to that used with respect to the disc insert described immediately above, a liner may be formed from the desiccant entrained polymer that has an exterior surface substantially conforming to an interior surface of the polypropylene container body. Like the disc, the liner may be sized so that it may be press-fit into position within the polymer body where it is held sufficiently snugly to prevent its unintended disengagement therefrom. Alternatively, either the plug or liner may be initially constructed and allowed to harden, and then the container body subsequently constructed thereabout so that the greater shrinkage characteristics of the polymer body not containing desiccant tightly shrink-fits the container body about the plug or liner so that neither becomes easily disengaged from the other. In still a further embodiment, the insert taking the form of either a plug or a liner may be substantially simultaneously comolded with the polymer container body so that each is integrally joined with the other. In the event of a comolding process, the viscosities of the desiccant laden insert and the polymer container body should be approximately equal to facilitate the proper and desired location of the two phases of liquid or molten material that are molded together.

In yet another embodiment, the desiccant entrained polymer may be used to form sheeting that is joined with a non-desiccant entrained polymer sheet. In at least one embodiment, the sheets are effectively laminated one to the other so that an exterior layer may be established adjacent to the desiccant entrained layer which is substantially moisture impermeable. The laminate sheet may then be used to wrap an item which is to be stored in a moisture-reduced environment. One means by which the joinder process may be accomplished is through a thermal extrusion procedure.

In each of the embodiments of the present invention described herein, advantages and enhancements over the prior art methods and structures stem from the discovery of the ability to create passages throughout a desiccant entrained polymer so that a rigid body may be constructed from the polymer while also exposing the entrained desiccant to moisture exterior to that structure. Furthermore, the discovery of employing a polyglycol, EVOH and similar type compounds as a channeling agent that also acts as a moisture bridge between the exterior of the polymer body and interiorly located desiccant greatly enhances the structures' ability to quickly remove moisture located exteriorly to the entrained structure, while at the same time taking advantage of a greater portion of the desiccating capacities of the desiccating agent entrained therein.

One embodiment of the present invention includes a process for producing a moisture absorbing desiccant containing polymer. The process comprises causing a polymer that acts as a moisture barrier in a solidified state to assume a molten state. A desiccating agent is blended into the polymer so that the desiccating agent is distributed within the polymer. A channeling agent is blended into the polymer so that the channeling agent is distributed within the polymer thereby creating a blended mixture. The mixture is solidified so that the channeling agent forms passages in the mixture through which moisture is communicable to desiccating agent entrained within the mixture. In another preferred embodiment, the polymer, channeling agent and desiccant are all thoroughly mixed in dry, powder form, with the polymer mix then being melted and formed into a desired shape by molding. The channeling agent thereby forms passages in the mixture through which moisture is communicable to desiccating agent entrained within the mixture.

In one embodiment, the blended mixture is used to form a plug for inclusion within a container constructed of a moisture barrier substance. In another, the mixture is used to form a liner for inclusion within a container constructed from a moisture barrier substance. In still another embodiment, the mixture is used to form a desiccating sheet. The desiccating sheet may optionally be combined with a barrier sheet constructed of a moisture barrier substance for use as a packaging wrap.

In another embodiment, the present invention includes a process for providing a moisture absorbing insert for a container. A desiccating agent and a channeling agent are blended into a polymer that acts as a moisture barrier in a solidified state thereby forming a mixture. The mixture is solidified so that the channeling agent forms passages in the mixture through which moisture is communicable to the desiccating agent entrained within the mixture.

Another embodiment of the present invention includes a method for making a desiccating container that includes forming a container from substantially moisture impermeable material so that a moisture barrier is created between an interior and exterior of the container. An insert is formed from desiccant bearing material, the insert having an exterior surface configured for mating engagement with at least a portion of an interior surface of the container. The insert is installed into the interior of the container so that at least a portion of the exterior surface of the insert abuttingly engages the interior surface of the container. The engagement fixes the insert relative to the container and resists disengagement of the insert from the container.

In still a further embodiment of the present invention, a desiccating enclosure is provided that includes a container formed from substantially moisture impermeable material so that a moisture barrier is created between an interior and exterior of the container. A liner is formed from desiccant bearing material so that the liner has an exterior surface configured for mating engagement with at least a portion of an interior surface of the container. The liner is inserted into the interior of the container so that at least a portion of the exterior surface of the liner abuttingly engages the interior surface of the container and the engagement fixes the liner relative to the container and resists disengagement of the liner from the container.

Another embodiment of the present invention is a desiccating insert for a closeable container. The desiccating insert is configured for installation into a closable container and is constructed from thermoplastic that is entrained with a desiccating agent. The desiccating agent is distributed substantially evenly throughout an interior of the insert. The insert has channels extending from an exterior surface of the insert into the insert's interior through which moisture is passable thereby exposing portions of the desiccating agent located within the interior of the insert to moisture located exteriorly to the insert for absorbing and retaining that exteriorly located moisture.

Among those benefits and improvements that have been disclosed, other objects and advantages of this invention will become apparent from the following description taken in conjunction with the accompanying drawings. The drawings constitute a part of this specification and include exemplary embodiments of the present invention and illustrate various objects and features thereof.

DETAILED DESCRIPTION OF THE PREFERRED EMBODIMENTS OF THE PRESENT INVENTION

Figure 1:
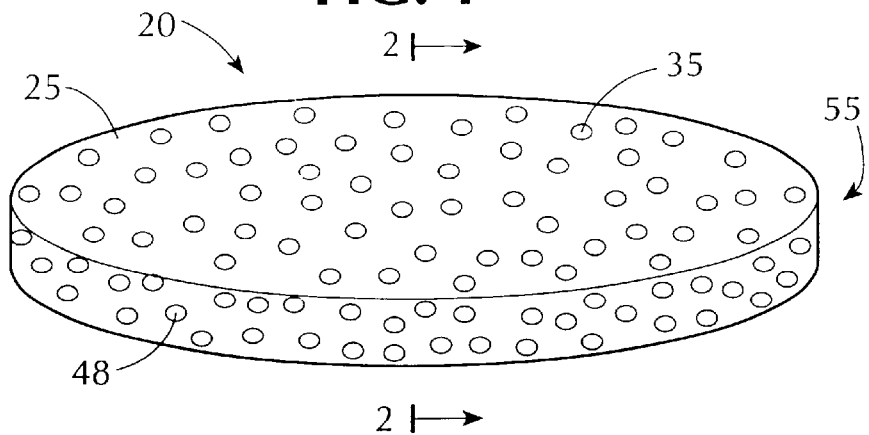
FIG. 1 is a perspective view of a plug, insert, or tablet constructed from channeled, desiccant entrained polymer showing, in an exaggerated scale, the openings of the channels at the exterior surface of the plug.

As required, detailed embodiments of the present invention are disclosed herein; however, it is to be understood that the disclosed embodiments are merely exemplary of the invention that may be embodied in various forms. The figures are not necessarily to scale, some features may be exaggerated to show details of particular components. Therefore, specific structural and functional details disclosed herein are not to be interpreted as limiting, but merely as a basis for the claims and as a representative basis for teaching one skilled in the art to variously employ the present invention.

Certain terminology will be used in the following description for convenience and reference only and should not be considered limiting. For example, the words "rightwardly", "leftwardly", "upwardly" and "downwardly" refer to directions in the drawings to which reference is made. The words "inwardly" and "outwardly" refer to directions toward and away from, respectively, the geometric center of the structure being referred to. This terminology includes these words, specifically mentioned derivatives thereof, and words of similar import.

Furthermore, elements may be recited as being "coupled"; this terminology's use anticipates elements being connected together in such a way that there may be other components interstitially located between the specified elements, and that the elements may be connected in fixed or movable relation, one to the other. Still further, some structural relationships or orientations may be designated with the word "substantially". In those cases, it is meant that the relationship or orientation is as described, with allowances for variations that do not effect the operation or cooperation of the so described component or components.

In general, the matrix base polymer material which can be used in making the structures of the present invention can be basically any thermoplastic material. Examples of suitable thermoplastic materials include polyolefins, polycarbonates, polyamides, ethylene-vinyl acetate copolymers, ethylene-methacrylate copolymer, polyvinyl chloride, polystyrene, polyester, polyester amide, polyacrylic ester, acrylic, polyurethane and polyacetal, or mixtures thereof. The polyolefins, specifically polypropylene and polyethylene, however, are most preferred for the present invention.

The channeling agent used in the present invention can be generally any hydrophilic material which is miscible, or can be made miscible, with the polymer base matrix upon melt mixing, and separates from the polymer matrix polymer to form the channeled structure of the present invention. In general, the preferred hydrophilic material is a polar compound having at least several hydroxy groups. The preferred material has been found to be polyglycols, such as polyethylene glycol. Such polyglycols, such as polyethylene glycol, are highly miscible with polyolefins at high temperatures, but separate and form a second phase upon cooling. In essence, the polyglycols form essentially one phase with the polymer, which insures an excellent distribution of the polyglycol throughout the polymer. When the polyglycol separates from the polymer, the result is a finely channeled, uniform structure. Other suitable materials include EVOH, glycerin or PVOH. However, PVOH cannot be used alone and generally requires the use of a plasticizer to insure good miscibility with the polymer matrix. A dimer agent such as a propylene maleic anhydride must be used with glycerin to insure compatability with a polyolefin polymer matrix material. The use of such a dimer agent insures good uniform distribution of the channeling agent, and hence channels, throughout the polymer matrix. Ethylene vinyl alcohol is suitable, but is inferior to the polyglycols in germs of miscibility with the polymer matrix, and hence the channeling effect. Therefore, polyglycols, all of the different molecular weights, are the most preferred materials for use as channeling agents in accordance with the present invention. Other suitable materials which can be used as channeling agents can include polyvinylpyrollidine, vinylpyrollidone or N-methyl pyrollidone, with polysaccharide based compounds such as glucose, fuctrose, and their alcohols, and mannitol being very suitable for the purposes of the present invention since they are hydrophillic compounds having numerous hydroxy groups.

An example of a preferred suitable composition for use in making the structure of the present invention would include a desiccant, such as molecular sieves, a polypropylene, and a polyglycol. The amounts of the various components would be for example, from 30–80%, more preferably from 40–70% of the desiccant, and most preferably about 60 wt %; from 20–40 wt % of the polypropylene, e.g. polypropylene homopolymer available from Exxon [3505], having a melt flow of 400, most preferably about 30 wt %; and from 5–20 wt % of the polyglycol, e.g., poly[ethylene propylene glycol] available from Dow (15–200), with the amount of polyglycol being most preferably about 10 wt %.

In general, the components can be dry mixed in a mixer such as a Henschel, and then fed to a compounder. A Leistritz twin screw extruder, for example, or a Werner Pfleider mixer can be used to achieve a good melt mix at 400° F. The melt can then be either extruded as a film or converted into pellets using dry air cooling on a vibrating conveyer. The formed pellets, containing channels, can then be either injection molded into beads, sieves, or co-injected with polypropylene as the inside layer of a container.

Figure 2:
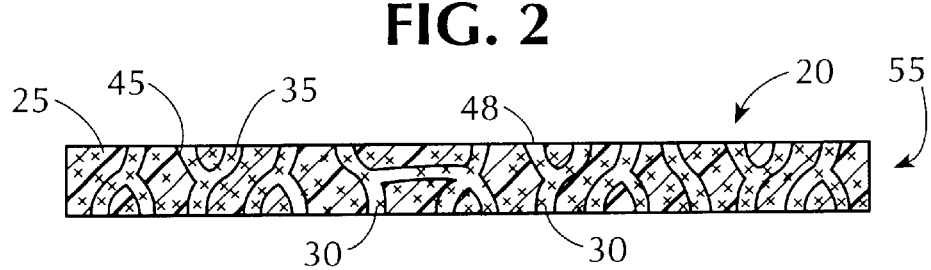
FIG. 2 is an exaggerated, cross-sectional view of a solidified plug formed from a polymer mixture having a channeling agent and a desiccating agent blended therewith.
Figure 5:
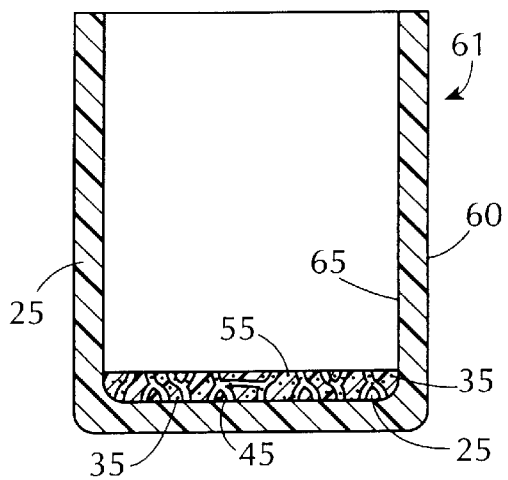
FIG. 5 is an exaggerated cross-sectional view of a portion of a container having a desiccant entrained plug insert located in the bottom of a container constructed from a polymer that acts as a moisture barriers

Referring to FIG. 1 of the accompanying drawings, an insert constructed from a desiccant entrained polymer 20 is illustrated. For purposes of this disclosure of the present invention, the words "entrain" and "contain" have been used interchangeably when referring to the inclusion of a desiccating agent 30 in a polymer 25 matrix. The insert is in the form of a plug 55 that may be deposited into a container body 60 (FIG. 5) thereby establishing a desiccating container 61 (FIG. 5). Referring to FIG. 2, a cross-sectional view is shown of the plug 55 that has been constructed from a polymer mixture comprising a polymer base 25 that has been blended with a desiccating agent 30 and a channeling agent 35. In the illustration of FIG. 2, the mixture has solidified so that veins or channels 45 have formed throughout the polymeric mixture to establish passages throughout the solidified plug 55. As may be appreciated in both FIGS. 1 and 2, the passages terminate in channel openings 48 at an exterior surface of the plug 55.

Figure 3:
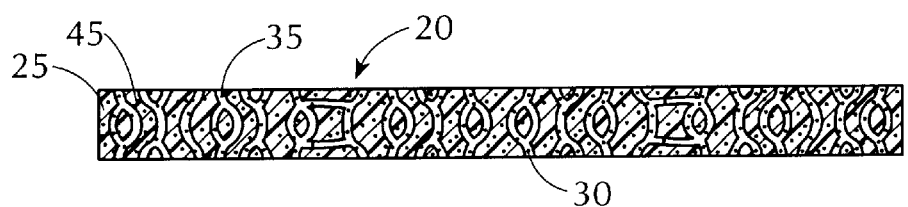
FIG. 3 is an exaggerated, partial cross-sectional view of a solidified plug formed from a polymer mixture having a channeling agent, a desiccating agent, and a dimer agent blended therewith.

FIG. 3 illustrates a plug 55 similar in construction and makeup to the plug 55 of FIG. 2, where the channels or veins are very fine. This can result from the use of polyglycols as the channeling agent, or the use of a dimer agent a plasticizer together with a less preferred channeling agent. The dimer agent 50 enhances the compatibility between the polymer 25 and the channeling agent 35. This enhanced compatibility is facilitated by a lowered viscosity of the mixture which promotes a more thorough blending of the two compounds 25,35 which resists combination into a uniform solution. Upon solidification of the mixture that has had a dimer agent added thereto, the passages which are formed therethrough have a greater dispersion and a smaller porosity thereby establishing a greater density of passages throughout the plug 55. This same effect occurs readily when a polyglycol is used as the channeling agent due to the general comparability of polyglycols with hydrophobic thermoplastics such as polyolefins. The channels or passages are created to provide pathways through which moisture can travel from the exterior of the solidified plug 55 to interior locations where entrained desiccant 30 is bound. These passages are required because of the hydrophobic characteristics of the polymer 25 which resist moisture permeability therethrough and therefore acts as a moisture barrier. For this reason, the polymer 25 itself is referred to as a moisture barrier substance within which a desiccant 30 may be entrained. To expose the desiccant 30 entrained within the interior of the polymer 25, however, the channels 45 are provided. Without the passages 45, relatively small quantities of moisture would be absorbed by the entrained desiccating agent 30. These small amounts derive from the limited number of desiccant particles 30 that would be exposed at the exterior surface of the formed body and the very small amounts of moisture that would be able to pass through the substantially moisture impermeable polymer 25. Because of these characteristics, the polymer 25 is referred to as a moisture barrier even though it may not be completely impermeable to moisture. In the illustration of FIG. 3, the passages 47 can be enhanced by a dimer agent or plasticizer, but the desiccating agent 30 is evenly distributed throughout the mixture matrix. As a result, at least portions of the desiccating agent 30 will be entrained within the polymer 25 which resist transmission of moisture and therefore seals those particles of desiccating agent 30 within the polymer 25 from moisture absorption.

Figure 4:
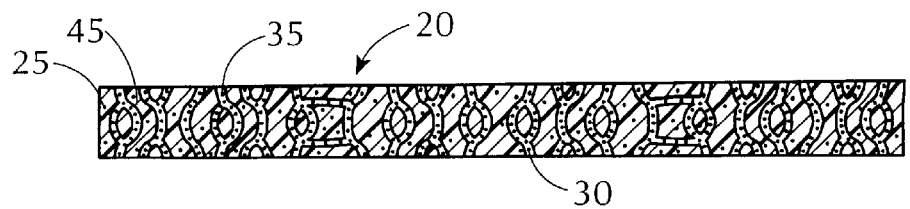
FIG. 4 is an exaggerated, partial cross-sectional view of a solidified plug formed from a polymer mixture having a channeling agent, a polarized desiccating agent, and a dimer agent blended therewith.

FIG. 4 illustrates a solidified plug 55 wherein the desiccating agent 30 has been selected so that it is polarized and therefore attracted to the channeling agent 35. As a result, during the solidification process, the desiccating agent 30 aggregates in the channeling agent 35 and becomes entrained therein in a concentration higher than in the polymer 25. As a result, a greater percentage of the desiccating agent 30 is entrained within the channeling agent 35 and therefore placed in communication with moisture exterior to the plug 55 thereby improving the plug's 55 moisture absorbing characteristics. In at least one embodiment, the channeling agent 35 is selected so that it has a property which encourages transmission of moisture thereacross. The rate at which moisture is transmitted across the channeling agent 35 is greater than the rate at which moisture may be transmitted across the polymer 25. This tends to provide a ready supply of moisture, when present, to the desiccating agent 30 entrained within the channeling agent 35 and to that desiccating agent 30 that is entrained within the polymer 25, but adjacent to and exposed to the channeling agent 35. Examples of channeling agents 35 having these characteristic are the polyglycols, EVOH and PVOH, each of which transmit moisture at a rate greater than the polymer 25 and the desiccating agent 30. As a result, the channeling agent 35 acts as a bridge between moisture exterior to the plug 55 and the desiccating agent 30 entrained within the plug's 55 interior.

FIG. 5 illustrates a plug 55 which has been deposited into a container body 60 thereby establishing a desiccating container 61. The container body 60 has an interior surface 65 and is constructed substantially from a moisture barrier polymer 25. In this manner, moisture is resisted from being transmitted across a wall of the container 60 when the container 60 is closed. As may be seen in FIG. 5, the plug 55 has been press fit into a bottom location of the container 60. It is contemplated that the plug 55 may be merely deposited in the container 60 for loose containment therein, but it is preferable coupled to the body of the container 60 in a manner that fixes the plug 55 to the container 60. The couple between the plug 55 and the container body 60 is intended to prevent the dislocation and relative movement of the plug 55 thereabout. This connection may be accomplished by a snug press fit between the plug 55 and the interior surface 65 of the body 60, or it may be mechanically connected in such manners as adhesives, prongs, lips or ridges that extend about the plug 55 to hold the plug 55 in place. In yet another embodiment, it is contemplated that the container body 60 may be molded about the plug 55 so that during the curing process of the container body 60 the body 60 shrinks about the plug 55 thereby causing a shrink-fit to be established between the two components. This type of couplement may also be accomplished in a comolding process or sequential molding process with the same results achieved because the desiccant entrained plug 55 will have less shrinkage than the polymer 25 comprised container body 60.

Figure 6:
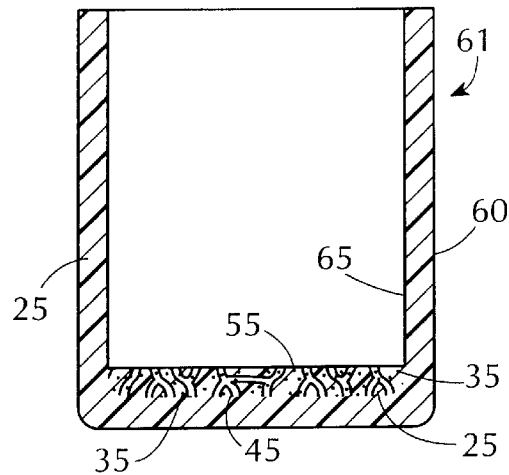
FIG. 6 is an exaggerated cross-sectional view of a portion of a container having a desiccant entrained plug that has been comolded into the bottom of a container that is constructed from a polymer that acts as a moisture barrier.

FIG. 6 illustrates a desiccating container 61 having a desiccant entrained plug 55 located at a bottom location of the container 60 similar to the configuration illustrated in FIG. 5, but the plug 55 and container body 60 are comolded so that a unified body 61 is formed with a less distinct interface between the plug 55 and body 60 components.

Figure 7:
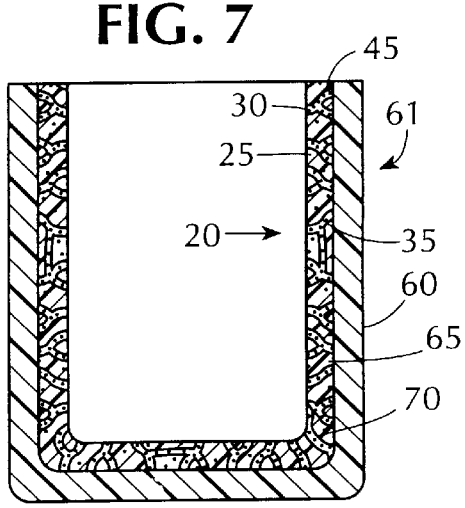
FIG. 7 is an exaggerated cross-sectional view of a portion of a container having a desiccant entrained liner insert located within the interior of a container constructed from a polymer that acts as a moisture barrier.
Figure 8:
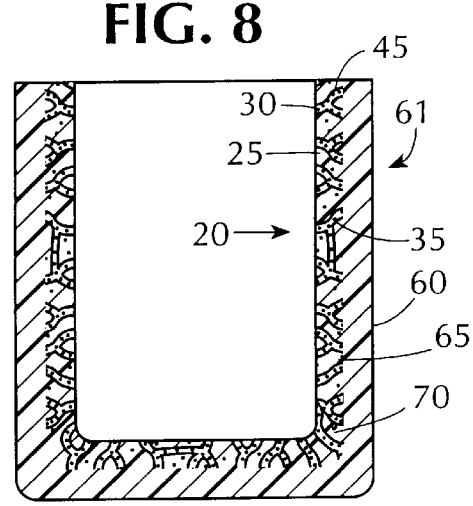
FIG. 8 is an exaggerated cross-sectional view of a portion of a container having a desiccant entrained liner that has been comolded at the interior of a container that is constructed from a polymer that acts as a moisture barrier.

FIGS. 7 and 8 illustrate concepts similar to those of FIGS. 5 and 6, however the proportions of the plug 55 have been extended so that a liner 70 is formed which covers a greater portion of the interior surface 65 of the desiccating container 61. The liner 70 is not localized in the bottom portion of the container body 60, but has walls which extend upwardly and cover portions of the walls of the container 61. Like the plug 55, the liner 70 may be separately molded and subsequently combined with the container body 60 or it may be comolded therewith into the unified body illustrated in FIG. 8.

Figure 9:
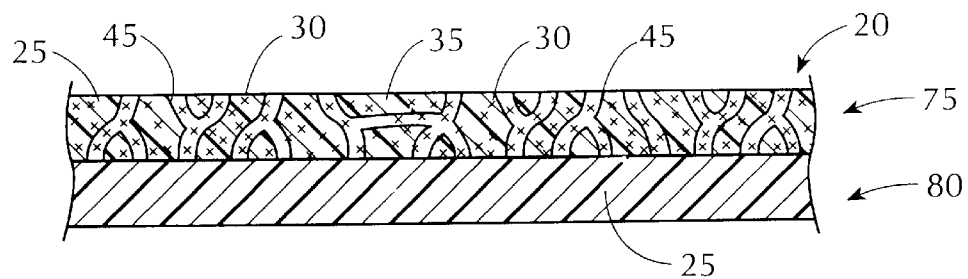
FIG. 9 is an exaggerated cross-sectional view of a desiccating sheet or area located adjacent to a barrier sheet constructed from a polymer that acts as a moisture barrier.
Figure 10:
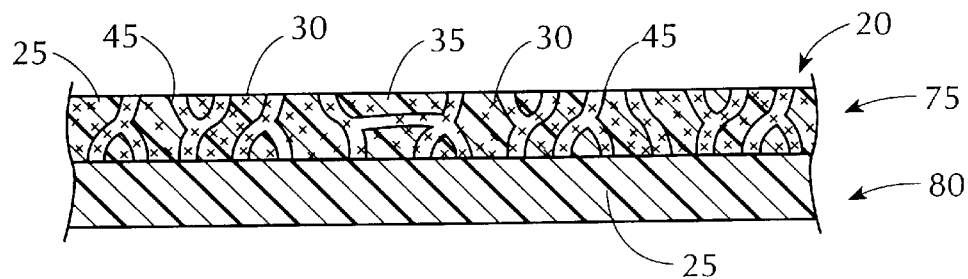
FIG. 10 is an exaggerated cross-sectional view of a desiccating sheet or area that has been comolded at an interior of a barrier sheet so that the products are integrally molded together and comprise one unified laminate.

FIGS. 9 and 10 illustrate an embodiment of the invention in which a desiccating sheet 75 is created for combination with a barrier sheet 80. The characteristics of the sheets are similar to those described with respect to the plug 55 and liner 70 and container body 60. That is, FIG. 9 illustrates an embodiment in which the two sheets 75,80 are separately molded, and later combined to form a packaging wrap having desiccating characteristics at an interior surface and moisture resistant characteristics at an exterior surface. FIG. 10 illustrates a comolded process wherein an interface between the desiccating sheet 75 and the barrier sheet 80 is less distinct than in the embodiment of FIG. 9. This product can be produced by a thermal, forming process. In such a process, the polymer layer is melted and partially formed into a sheet with the desiccating agent 30 being deposited on top of that layer just prior to being pressed or extruded through a slit-like opening in the thermal forming machine. It is contemplated that the separate sheets 75,80 of FIG. 9 may be joined together with an adhesive or other suitable means to form a laminate from the plurality of sheets 75,80. Alternatively, the sheeting 75,80 may be manufactured from a thermal extrusion process whereby both sheets 75,80 are manufactured at the same time and effectively comolded together to form the embodiment illustrated in FIG. 10.

Figure 11:
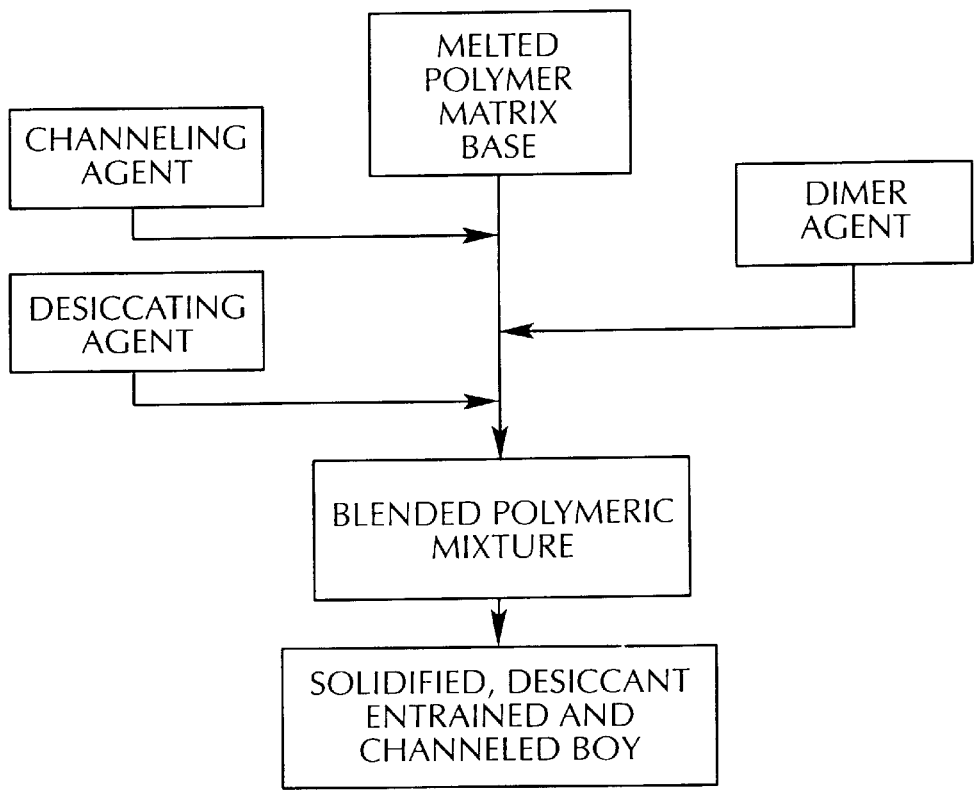
FIG. 11 is a schematic of the process for forming desiccant entrained plugs, liners and sheets according to the present invention.

FIG. 11 provides a schematic illustration of the process by which the several embodiments of a desiccating container 61 may be formed. The details of those processes have been described herein with respect to the several varying structures that may be established from the basic mixture or combination of a polymer base 25 with a desiccating agent 30 and a channeling agent 35. As disclosed, a dimer agent or plasticizer may be optionally provided to enhance the channeling characteristics of the mixture during the solidification process.

In view of the descriptions provided above relevant to possible embodiments of the present invention and the included figures illustrating the same, the following embodiments are also disclosed. In one embodiment, the present invention includes a process for producing a moisture absorbing desiccant entrained polymer 20. A polymer 25 is caused to assume a molten state, typically by applying heat and melting the polymer. To achieve certain results in the hardened end product, such as rigidity and durability, the polymer 25 normally acts as a moisture barrier in a solidified state, both before and after melting. A desiccating agent 30 is blended into the polymer 25 so that the desiccating agent 30 is distributed within the polymer 25. A channeling agent 35 is also blended into the polymer 25 so that it is distributed within the polymer 25. Together, the polymer 25, desiccating agent 30 and channeling agent 35 create a blended mixture. The mixture is solidified so that the channeling agent 35 forms passages in the mixture through which moisture is communicable to desiccating agent 30 that is entrained within the mixture.

The channeling agent 35 separates from the polymer 25 into veins or channels 45 that extend through the polymer 25. When hardened into a rigid plastic body, these channels 45 form the moisture communicating passages 45 throughout the plastic body.

A dimer agent or plasticizer may be optionally blended into the mixture to increase the mixing compatibility of the polymer 25 and the channeling agent 35 thereby increasing the dispersion of the passages within the solidified mixture. This occurs because the viscosity of the mixture is lowered and the polymer 25 and channeling agent 35 more thoroughly mix. This causes the passages that are formed to have smaller pore sized and to be more densely dispersed throughout the solidified body of the mixture.

The polymer 25 is a moisture barrier that more greatly resists diffusion of moisture thereacross than does the desiccating agent 30 or the channeling agent 35; it is not necessary that the polymer 25 be absolutely moisture impermeable, however.

The channeling agent 35 facilitates diffusion of moisture therethrough at a rate greater than the desiccating agent 30 or the polymer 25.

The desiccating agent 30 has a greater moisture absorbing capacity by weight than the channeling agent 35 or the polymer 25.

The desiccating agent 30 has a greater attraction for the channeling agent 35 than for the polymer 25. As a result, upon solidification of the mixture, a greater concentration of desiccating agent 30 forms in the channeling agent 35 than in the polymer 25.

The channeling agent 35 acts as a moisture bridge between passage openings 48 at an exterior surface of the mixture and desiccating agent 30 entrained within the mixture.

The polymer 25 may be selected from a group that includes, but is not limited to polypropylene and polyethylene.

The channeling agent 35 is selected from a group that includes, but is not limited to a polyglycol such as polyethylene glycol, glycerin, ethylene-vinyl alcohol (EVOH) and polyvinyl alcohol (PVOH).

The desiccating agent 30 is of the type that physically absorbs moisture, is inert and non-water soluble.

In a further embodiment of the present invention, a plug 55 is formed from the mixture for inclusion within a container 60 that is constructed from a moisture barrier substance.

In one embodiment, the plug 55 is deposited into a container 60 that is constructed from a moisture barrier substance. In this manner, a desiccating-container 61 is created.

The plug 55 may be coupled to an interior surface of the container body 60 so that the plug 55 is fixed relative to the container 60.

Alternatively, a container 60 constructed from a moisture barrier substance may be molded about the plug 55 so that at least a portion of the plug 55 is exposed to an interior of the container 60.

A desiccating plug 55 made according to the present invention may also be comolded with a container 60 that is constructed from a moisture barrier substance so that at least a portion of the plug 55 is exposed to an interior of the container 60.

In another embodiment, a liner 70 may be formed from the mixture 40 and then be included within a container 60 constructed from a moisture barrier substance. The liner 70 typically, but not necessarily, has an exterior surface configured for mating engagement with an interior surface 65 of the container 60.

The liner 70 may be pressed into mating engagement with the container 60 so that a desiccating container 61 is created wherein at least a majority of the interior surface 65 of the container is covered by the liner 70.

The liner 70 may be formed from the mixture 40 and then a container 60 constructed from a moisture barrier substance may be molded about the liner 70 so that at least a portion of the liner 70 is exposed to an interior of the container 60 and a majority of an interior surface 65 of the container 60 is covered by the liner 70.

Alternatively, the liner 70 and container body 60 may be comolded together into a unified body.

In an alternative embodiment of the present invention, a process for producing a moisture absorbing desiccant entrained polymer sheet 75 is provided. A desiccating agent 30 is blended into the polymer 25 so that the desiccating agent 30 is distributed within the polymer 25. A channeling agent 35 is also blended into the polymer 25 so that the channeling agent 35 is distributed within the polymer 25 thereby creating a blended mixture of polymer 25, desiccant 30, and channeling agent 35. The mixture is then formed into a desiccating sheet 75 so that veins 45 of channeling agent 35 form passages in the sheet 75 through which moisture is communicable to desiccating agent 30 entrained within the mixture.

The desiccating sheet 75 is combined with a barrier sheet 80 that is constructed of a moisture barrier substance for use as a packaging wrap.

The sheets 75,80 may be laminated by thermal extrusion.

In yet another embodiment of the invention, a process for making a moisture absorbing insert for a container 60 is provided. The process includes blending a desiccating agent 30 and a channeling agent 35 into a polymer 25 so that a mixture is formed. The mixture is then solidified so that the channeling agent 35 forms passages in the mixture through which moisture is communicable to the desiccating agent 30 entrained within the mixture.

A dimer agent may optionally be added to the mixture to increase the mixing compatibility of the polymer 25 and the channeling agent 35 thereby increasing the dispersion of the passages within the solidified mixture.

In still another embodiment of the present invention, a method for making a desiccating container 61 is provided. The method includes forming a container 60 from substantially moisture impermeable material so that a moisture barrier is created between an interior and exterior of the container. An insert is formed from desiccant bearing material. The insert has an exterior surface that is configured for mating engagement with at least a portion of an interior surface 65 of the container 60. The insert is installed into the interior of the container 60 so that at least a portion of the exterior surface of the insert abuttingly engages the interior surface 65 of the container 60. The engagement fixes the insert relative to the container 60 and resists disengagement of the insert from the container 60.

The insert is channeled with passages 45 so that desiccant 30 within an interior of the insert is exposed to the interior of the container 60 for absorbing moisture.

The insert is pressed into the interior of the container 60 with sufficient force that the insert fits tightly within the container 60 thereby resisting disengagement therefrom.

The insert is sized and shaped so that the insert fits snugly into a receiving location within the interior of the container for retention at the receiving location.

In another embodiment, the insert is sized and shaped into a plug 55 that fits snugly into a receiving location at a bottom portion of the interior of the container 60 for retention at the receiving location.

Alternatively, the insert is configured into a liner 70 having an exterior surface that conforms to the interior surface 65 of the container 60 so that a majority of the liner's 70 exterior surface is in abutting engagement with the container's 60 interior surface 65.

The container 60 and the liner 70 are similarly configured so that the interior 65 of the container 60 and the exterior of the liner 70 fit snugly together so that disengagement of the liner 70 from the container 60 is resisted.

The container 60 may be molded from a plastic that is substantially moisture impermeable and therefore resists the transmission of moisture across the boundary of the container 60 between its exterior and its interior. Also, the liner 70 may be molded from a desiccant entrained plastic 20 capable of absorbing and retaining moisture therein.

A releasable cap means may also be provided for closing the container 60. In this way, the liner 70 is substantially sealed within the capped container 60 by installing the cap means upon the container. Moisture held within the interior volume of the container 60 may then be removed by the desiccant 30.

A product may be stored in the substantially moisture free interior of the lined container 61 by enclosing the product therein.

In yet another embodiment, a method for making a desiccating container 61 is provided. A container is formed from substantially moisture impermeable material so that a moisture barrier is established between an interior and exterior of the container 60. A substantially solid tablet or plug 55 is formed from desiccant bearing material 20, the tablet 55 being suitably sized to fit within the interior of the container 60. The tablet 55 is then deposited into the interior of the container 60 thereby establishing a means for desiccating the interior of the container 60 when the container 60 is closed about the tablet 55.

In another embodiment of the present invention, a method for making desiccating packaging is provided. An outer skin, sheet, or layer 80 is formed from a substantially moisture impermeable sheet of material so that a moisture barrier is created between opposite sides of the skin. An inner skin, sheet, or layer 75 is formed from desiccant bearing material 20 at one side of the outer skin 80. A desiccating package is formed about a product or item by sealing the product or item within the outer moisture impermeable skin 80 and with the inner desiccating skin 75 located adjacent to the product.

A desiccating laminate may be formed by suction vacuum molding the outer skin 80 and the inner skin 75 together to form desiccating packaging.

In one embodiment of the present invention, a desiccating enclosure 61 is provided. The enclosure includes a container 60 formed from substantially moisture impermeable material so that a moisture barrier is created between an interior and exterior of the container 60. A liner 70 is formed from desiccant bearing material 20 so that the liner 70 has an exterior surface configured for mating engagement with at least a portion of an interior surface 65 of the container 60. The liner 70 is inserted into the interior of the container 60 so that at least a portion of the exterior surface of the liner abuttingly engages the interior surface 65 of the container 60. The engagement fixes the liner 70 relative to the container 60 and resists disengagement of the liner 70 from the container 60.

In another embodiment of the present invention, a desiccating insert for a closeable container 60 includes a desiccating insert configured for installation into a closable container 60. The insert is constructed from thermoplastic entrained 25 with a desiccating agent 30 that is distributed substantially evenly throughout an interior of the insert. The insert has passages extending from its exterior surface into its interior. Moisture is passable through the channels or passages thereby exposing portions of the desiccating agent 30 located within the interior of the insert to moisture located exteriorly to the insert for absorbing and retaining that exteriorly located moisture.

Desiccant entrained plastic structures, and their constituent compounds have been described herein. As previously stated, detailed embodiments of the present invention are disclosed herein; however, it is to be understood that the disclosed embodiments are merely exemplary of the invention that may be embodied in various forms. It will be appreciated that many modifications and other variations that will be appreciated by those skilled in the art are within the intended scope of this invention as claimed below without departing from the teachings, spirit and intended scope of the invention.

I claim:

1. An article of manufacture comprising a shaped article formed by:
    (a) mixing a polymer, a desiccating agent and a channeling agent, wherein the channeling agent is a hydrophilic material;
    (b) heating the mixture at a temperature at least above the melt point of the channeling agent so that the desiccating agent and channeling agent are distributed within the polymer;
    (c) cooling the mixture to form passages containing the channeling agent through which moisture is communicable with the desiccating agent.

2. An article of manufacture comprising a shaped article formed by:
    (a) heating a polymer;
    (b) mixing a desiccating agent and a channeling agent with the polymer material at a temperature at least above the melt point of the channeling agent, wherein the channeling agent is a hydrophilic material; and
    (c) cooling the blend to form passages containing the channeling agent through which moisture is communicable with the desiccating agent.

3. The article of claims 1 or 2 wherein the polymer is a thermoplastic.

4. The article of claim 3, wherein the desiccating agent is selected from the group consisting of silica gel, molecular sieve and clay.

5. The article of claims 1 or 2 wherein the channeling agent is selected from the group of a polyglycol, glycerin, ethylene-vinyl alcohol and polyvinyl alcohol.

6. The article of claims 1 or 2 wherein the desiccating agent is of the type that physically absorbs moisture, is inert and non-water soluble.

7. The article of claims 1 or 2 further comprising;
    forming a plug from the mixture for inclusion within a container constructed of a substantially moisture impermeable barrier material.

8. The article of claim 7, wherein the article is a container.

9. The article of claims 1 or 2 further comprising:
    forming a liner with the mixture for inclusion within a container constructed from a substantially moisture impermeable barrier substance, the liner having an exterior surface configured for mating engagement with an interior surface of the container.

10. The article of claims 1 or 2 further comprising:
    molding a liner from the mixture; and
    molding a container from a moisture barrier substance about the liner so that at least a portion of the liner is exposed to an interior of the container and a majority of an interior surface of the container is covered by the liner.

11. The article of claims 1 or 2, wherein the article is in the form of a disc.

12. The article of claims 1 or 2, wherein the article is in the form of a film.

13. The article of claims 1 or 2, wherein the article is in the form of a sleeve.

14. The article of claims 1 or 2, wherein the article is in the form of beads.

15. The article of claims 1 or 2, wherein the article is in the form of a sheet.

16. The article of claims 1 or 2, wherein the article is molded into a shaped article.

17. The article of claims 1 or 2, wherein the article is extruded into a shaped article.

18. An article of manufacture comprising a monolithic composition formed by:
    (a) mixing a polymer, a desiccating and a channeling agent, wherein the channeling agent is a hydrophilic material;
    (b) heating the mixture at least above the melt point of the channeling agent so that the desiccating agent and channeling agent are distributed within the polymer; and (c) cooling the mixture to form channels containing the channeling agent.

19. An article of manufacture comprising a monolithic composition formed by:
(a) mixing a polymer selected from the group consisting of polyolefins, polycarbonates and polyamides; a desiccating agent selected from the group consisting of silica gel, molecular sieve and clay; and a channeling agent selected from the group consisting of polyglycol, glycerin, ethylene-vinyl alcohol and polyvinyl alcohol;
(b) heating the mixture at least above the melt point of the channeling agent so that the desiccating agent and channeling agent are distributed within the polymer; and
(c) cooling the mixture to form a monolithic composition.

20. An article of manufacture comprising a monolithic composition formed by:
(a) mixing a polymer, a desiccating agent and a channeling agent, wherein the channeling agent is a hydrophilic material;
(b) exposing the mixture to a temperature at least above the melt point of the channeling agent so that the desiccating agent and channeling agent are distributed within the polymer; and
(c) forming a monolithic composition having channels containing the channeling agent.

21. The article of claim 20, wherein: (a) the polymer is selected from the group consisting of polyolefins, polycarbonates and polyamides; (b) the desiccating agent is selected from the group consisting of silica gel, molecular sieve, and clay; and (c) the channeling agent is selected from the group consisting of polyglycol, glycerin, ethylene-vinyl alcohol and polyvinyl alcohol.

22. An article of manufacture comprising a monolithic composition formed by:
(a) mixing a polymer, a desiccating agent and a channeling agent, wherein the channeling agent is a hydrophilic material;
(b) exposing the mixture to a temperature at least above the melt point of the channeling agent so that the desiccating agent and the channeling agent are distributed within the polymer; and
(c) cooling the mixture to form a monolithic composition having channels containing the channeling agent.

23. The article of claim 22, wherein the article is in a form of a sheet.

24. The article of claim 22, wherein the article is extruded into a shaped article.

25. The article of claim 22, wherein the desiccating agent is selected from the group consisting of a silica gel, molecular sieve and clay.

26. The article of claim 22, wherein the article is a container.

27. The article of claim 22, wherein the polymer is a thermoplastic.

28. The article of claim 22, wherein the channeling agent is selected from the group consisting of a polyglycol, glycerin, ethylene-vinyl alcohol and polyvinyl alcohol.

29. The article of claim 22, wherein the article is in the form of a disc.

30. The article of claim 22, wherein the article is in the form of a film.

31. The article of claim 22, wherein the article is in a form of a sleeve.

32. The article of claim 22, wherein the article is in a form of beads.

* * * * *